Jan. 13, 1953     L. BODDY     2,625,132

ELECTRIC GAUGE MECHANISM

Filed Dec. 9, 1948

INVENTOR.
Leonard Boddy.
BY
Harness, Dickey & Pierce
ATTORNEYS.

Patented Jan. 13, 1953

2,625,132

UNITED STATES PATENT OFFICE 2,625,132

ELECTRIC GAUGE MECHANISM

Leonard Boddy, Ann Arbor, Mich., assignor, by mesne assignments, to The Anderson Company, Gary, Ind., a corporation of Indiana Application December 9, 1948, Serial No. 64,357

5 Claims. (Cl. 116—129)

This invention relates to indicator mechanisms or gauges and, in particular, refers to pointer suspensions therefor.

Though of course, not so limited, the present invention is particularly applicable to devices for detecting and indicating small variations in electric current. Such devices often include a bimetallic actuator strip which is surrounded by a heater coil through which the current to be measured is passed. Variations in the current cause corresponding variations in the temperature of the bimetallic actuator, and this member, in accordance with its well known principle of operation, is distorted or warped to the extent of the change in current. It will be appreciated that in applications of this sort the bimetallic strip must of necessity be quite small and sensitive and that the forces created by its distortion are indeed quite minute. It therefore becomes a difficult problem to operably connect an indicator needle or pointer to the bimetallic strip in a simple manner that provides little resistance to the forces of distortion and yet is capable of responding to and magnifying the movement of the strip over an appreciable portion of its range of movement. This problem has been solved in a novel manner by means of the present invention so that the range of strip distortion which can be indicated is substantially greater than that of the prior art devices.

A preferred form of pointer suspension constructed in accordance with the principles of the invention to provide the improved results just indicated is shown by way of illustration in the accompanying drawings, in which.

Figure 1:
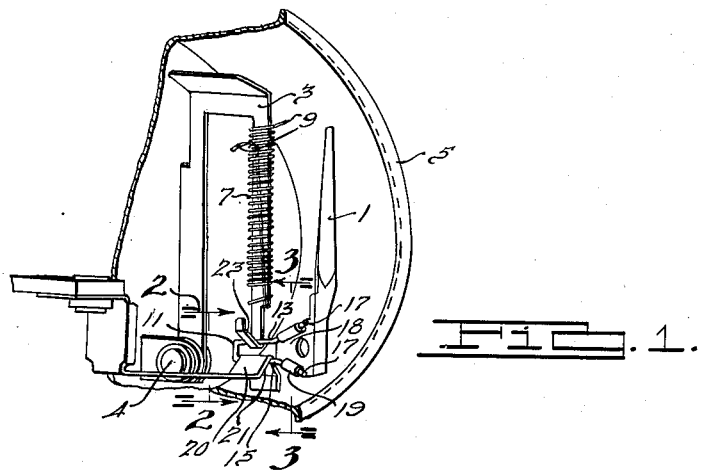
Fig. 1 is a perspective view with parts broken away of the pointer suspension.
Figure 2:
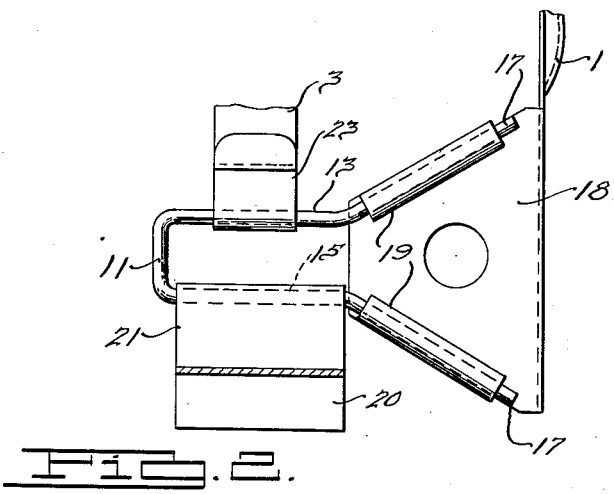
Fig. 2 is a side elevation of the suspension mounting as viewed from plane 2—2 of Fig. 1.

The improved pointer suspension includes a pointer 1 which indicates distortion of the bimetallic strip or actuator member 3 in amplified form. Member 3 may include an ambient temperature compensating leg which is riveted at 4 or otherwise suitably secured to the indicator casing, which is partly shown at 5. A heater coil 7 surrounds the bimetallic member 3 and has leads 9 which are connected in a well known manner to the circuit in which current variations are to be measured. A variation in current changes the temperature of the strip 3 which therefore warps to assume a predetermined position dependent upon its temperature.

The improved means for suspending and operably connecting the pointer 1 to the strip 3 includes in its preferred form a substantially U-shaped hairpin 11 having the ends of its upper and lower cylindrical legs 13 and 15, respectively, flared outwardly, as shown at 17. The pointer 1 has a tapered transvers flange 18 formed thereon and extending normally to its plane of pivotal movement, and the edges 19 of this flange are bent around the flared pin portions 17 to securely clamp the hairpin 11 so that it also is transverse to the pointer. The pin 11 has a resilient pivotal connection which may comprise a tensor or spring strip 20 that has one end fixed in a suitable manner to the casing 5 and the other end provided with a V-shaped hook portion 21 that opens downwardly and seats a lower pin leg 15 in the base of the V. The strip 3 may have its extreme lower end bent backwardly at an acute angle to provide a hook portion 23 which opens upwardly (or points downwardly) and has the upper pin leg 13 seated in the apex thereof. The assembly of hairpin 11, actuator 3, and tensor 20 is made so that the latter element exerts a slight yieldable downward force thereon to hold the pin legs seated in their respective hook portions. This assembly is preferably also made so that in the zero position the plane of the hairpin 11 is substantially normal to that of the tensor strip 20 thus, enabling the pointer 1 to be forced in either direction without relaxation of the spring load on the hairpin leg 15.

Figure 3:
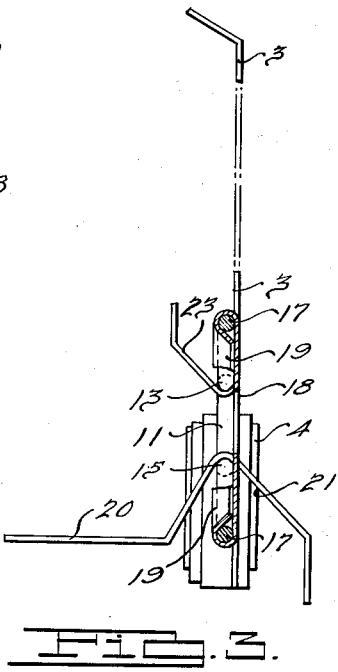
Fig. 3 is a cross section taken on the line 3—3 of Fig. 1.

In operation the pointer may have a zero position as shown in Figs. 1 and 3. Heat due to the effects of current in the coil 7 causes the temperature of the strip 3 to increase so that its hook 23 moves in a clockwise direction, carrying the pin leg 13 with it and forcing the pointer 1 to pivot on the lower leg 15 which is seated in the hook 21. The extent of this pivotal movement is limited only by the upward component of strip warpage, this being opposed by the spring strip 20. This does not become appreciable in the ordinary range of utility of the strip 3, which range, with the construction shown, corresponds to about a 70° movement of the pointer.

Figure 4:
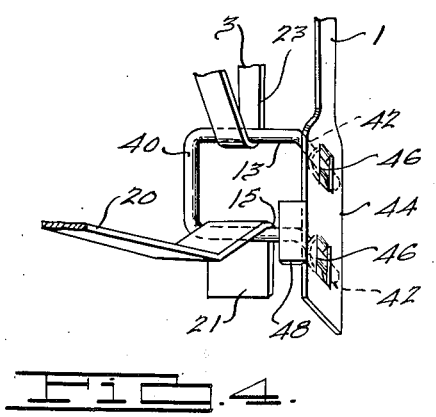
Fig. 4 is a perspective view with parts broken away of a modified form of the invention.

In the modified form of Fig. 4 the hairpin 40 has the end portions of its legs 13 and 15 laterally offset at 42 to lie substantially in the plane of pointer movement. The base 44 of the pointer is slit and then deformed transversely to provide lateral apertures 46 which tightly receive the laterally offset leg portions 42. The base 44 may have a transverse ear 48 bent around the leg 15 after the hairpin 40 is inserted in the apertures 46 to prevent it from becoming detached from the pointer.

It will be recognized that in addition to providing a pointer of increased amplitude, the invention also provides a mechanism which may be easily and inexpensively fabricated. The pointer, actuator, and tensor may be formed by stamping, and the hairpin may be formed by bending a suitable piece of wire. It will also be appreciated that the invention may be modified in various ways, so it is not intended to limit it specifically to the detailed construction shown.

What is claimed is:

1. In an indicator mechanism, the combination of an elongated pointer having a transverse flange, a substantially U-shaped hairpin having its legs secured to the side edges of said flange, an actuator member having a hook portion engaged with one leg of the hairpin, and a tensor member having a hook portion engaged with the other leg of the hairpin.

2. In an indicator mechanism having an elongated pivotal pointer, a suspension means for said pointer comprising in combination, a U-shaped wire element having a pair of rounded pin portions spaced longitudinally of the pointer and operatively connected thereto and extending transversely to the plane of movement thereof, an actuator for the pin portions having a first substantially V-shaped hook portion, a tensor having a second substantially V-shaped hook portion, one of said rounded pin portions being seated in the first hook portion and the other in the second hook portion.

3. In an indicator mechanism, the combination of an elongated pointer, a substantially U-shaped hairpin having end portions of its legs secured to said pointer with said legs extending generally parallel to each other and in a direction normal to the plane of swingable movement of said pointer, an actuator member having a hook portion engaged with one leg of the hairpin, and a tensor member having a hook portion engaged with the other leg of the hairpin.

4. In an indicator mechanism the combination of an elongated pointer, a generally U-shaped element having a pair of legs and a bight portion, fastening means provided on said pointer, the free ends of said element being secured to the pointer by said fastening means, an actuator member having a hook portion receiving and engaging one of the legs and a tensor member having a hook portion receiving and engaging the other leg, those portions of the legs engaged by said members being substantially cylindrical in formation.

5. In an indicator mechanism, the combination of an elongated pointer and a pair of substantially cylindrical bearings secured to one extremity of the pointer in parallel relationship for connection with a pair of suspension members.

LEONARD BODDY.

REFERENCES CITED

The following references are of record in the file of this patent:

UNITED STATES PATENTS

| Number    | Name    | Date           |
|-----------|---------|----------------|
| 1,885,052 | Smulski | Oct. 25, 1932  |
| 1,979,713 | Smulski | Nov. 6, 1934   |
| 2,022,441 | Smulski | Nov. 26, 1935  |
| 2,171,183 | Lamb    | Aug. 29, 1939  |
| 2,205,637 | Smulski | June 25, 1940  |
| 2,353,155 | Hall    | July 11, 1944  |